United States Patent
Asplund

[19]

[11] Patent Number: 5,872,707
[45] Date of Patent: Feb. 16, 1999

[54] SVC CONVERTER WITH AN EXTRA PHASE LEG TO REPLACE A FAILED PHASE LEG

[75] Inventor: Gunnar Asplund, Ludvika, Sweden

[73] Assignee: Asea Brown Boveri AB, Vasteras, Sweden

[21] Appl. No.: 932,958

[22] Filed: Sep. 18, 1997

[30]     Foreign Application Priority Data

Mar. 24, 1997 [SE] Sweden .................................. 9701068

[51] Int. Cl.⁶ .................................................. H02H 7/12
[52] U.S. Cl. ............................... 363/51; 363/53; 363/56; 363/127; 363/132
[58] Field of Search ..................................... 307/125, 126; 363/35, 51, 52, 53, 54, 55, 56, 58, 127, 129, 132, 137, 138

[56]                    References Cited

U.S. PATENT DOCUMENTS

| | | | |
|---|---|---|---|
| 4,507,724 | 3/1985 | Glennon ................................... | 363/132 |
| 4,941,079 | 7/1990 | Ooi .......................................... | 363/132 |
| 5,051,683 | 9/1991 | Hirose et al. ............................ | 323/207 |
| 5,280,421 | 1/1994 | De Doncker et al. .................... | 363/98 |
| 5,491,622 | 2/1996 | Carosa ...................................... | 363/56 |
| 5,535,113 | 7/1996 | Konishi ..................................... | 363/35 |
| 5,717,584 | 2/1998 | Rajashekasa et al. ................... | 363/132 |

OTHER PUBLICATIONS

ISBN 9–471–47580–7, vol. 1, 1971, Edward Wilson Kimbark, Direct Current Transmission (see chapter 1–3, 2nd paragraph).

*Primary Examiner*—Jeffrey Sterrett
*Attorney, Agent, or Firm*—Pollock, Vande Sande & Amernick

[57]                    ABSTRACT

A plant for transmitting electric power having an alternating voltage network with at least one phase and at least one VSC converter is provided. The converter has at least one phase leg with two current valves connected in series. Each phase leg is connected at a point between the two current valves to a respective phase of the alternating voltage network. The plant also comprises at least one additional phase leg in the converter more than the number of phases of the alternating voltage network and a means for disconnecting a phase leg from its respective phase and for connecting the additional phase leg at a point between its two current valves to the disconnected phase.

10 Claims, 1 Drawing Sheet

SVC CONVERTER WITH AN EXTRA PHASE LEG TO REPLACE A FAILED PHASE LEG

BACKGROUND OF THE INVENTION

The present invention relates to a plant for transmitting electric power comprising an alternating voltage network having at least one phase and at least one VSC-converter having at least one phase leg with two current valves connected in series, in which one point of the phase leg between the two current valves is connected to the phase of the alternating voltage network.

A plant of this type may, for example, be a plant for transmitting electric power between a direct voltage network for High Voltage Direct Current (HVDC) and an alternating voltage network. Such a plant has recently become known through the thesis "PWM and Control of Two and Three Level High Power Voltage Source Converters" by Anders Lindberg, Kungliga Tekniska Högskolan, Stockholm, 1995. It is emphasized that the invention is not restriction to this application, but the plant may, for example, comprise a SVC (Static Var Compensator), in which the direct voltage side of the converter is not connected to any direct voltage network but to a direct voltage capacitor freely arranged. However, to illuminate, but accordingly not limit the invention, a plant of the type defined in the introduction for HVDC will hereinafter be described.

The number of phases of the alternating voltage network, and thereby the number of phase legs of the VSC-converter in such a plant, may be arbitrary, but there are usually three phases of the alternating voltage network and thereby three phase legs of the VSC-converter, and accordingly six current valves therein in total, so that the converter constitutes a six-pulse bridge. In the event of a fault in a phase leg of the converter, the entire transmission of electric power between the direct voltage network and the alternating voltage network is wiped out in the HVDC-case, and in the case of SVC. The power transmission and the stabilizing of the voltage of the alternating voltage network therethrough also fail. In the HVDC-case, the entire transmission may also be wiped out upon any fault of one of the two pole conductors of the direct voltage network connected to the VSC-converter.

SUMMARY OF THE INVENTION

The object of the present invention is to provide a plant of the type defined in the introduction, which reduces the risk of having the entire transmission wiped out upon occurrence of any fault in the plant.

This object is, according to the invention, obtained by providing the converter of such a plant with at least one additional such phase leg more than the number of phases of the alternating voltage network, and that means are adapted to enable disconnection of a phase leg connected to one phase of the alternating voltage network from this phase, and connection of the additional phase leg with this phase instead.

By the presence of an additional phase leg, and the possibility of connecting this additional phase leg to a phase instead of the phase leg normally connected to this phase, transmission may be continued when a fault occurs on the phase leg normally connected by connecting the additional phase leg to this phase without any real disturbances in spite of the fault occurrence.

According to a preferred embodiment of the invention, the means comprise a controllable breaker arranged in the connection of each phase leg to its respective phase, and this additional phase leg has a connection to at least one phase through a controllable breaker. The possibility of connecting the additional phase leg to a phase instead of a failed phase leg may, in this way, be easily realized.

According to another preferred embodiment of the invention, each phase of the alternating voltage network is provided with a connection to an additional phase leg through a separate controllable connector. Continued power transmission in the plant is thereby possible when a fault occurs at one phase leg, irrespective of which phase leg has failed.

According to another preferred embodiment of the invention, the plant comprises one additional phase leg, and this additional phase leg has connections to each of the phases of the alternating voltage network through separate controllable breakers for each phase. An additional phase leg may thereby be utilized as a spare phase leg in common for all phase legs. In the case of failure of one of the phase legs, this additional phase leg will be switched in instead and maintenance may be carried out on the failing phase leg during continued operation of the plant if the different phase legs are physically separated.

According to another preferred embodiment of the invention, the alternating voltage network has three phases and the converter has three phase legs connected in a normal way to the alternating voltage network and one additional fourth phase leg. This constitutes an advantageous application of the embodiment last mentioned for a three-phase alternating voltage network.

According to another preferred embodiment of the invention, the converter is connected to a direct voltage network for High Voltage Direct Current (HVDC), the direct voltage network has two pole conductors, and controllable breakers are arranged between each phase leg of the converter and each pole conductor of the direct voltage network for optional connection of the respective phase leg to, or disconnection thereof from the direct voltage network. By providing each phase leg with such breakers with respect to the pole conductors, a failing phase leg may be totally isolated for maintenance work while an additional phase leg is switched in on the phase in question for continued power transmission.

According to another preferred embodiment of the invention, which is a further development of the embodiment last mentioned, a breaker is connected to each of the pole conductors and the additional phase leg has a connection to ground through a controllable breaker. The apparatus is adapted to break one of the pole conductors when a fault occurs thereon, to close the breaker to the connection to ground of the additional phase leg and to close the breaker of the additional phase leg for connection thereof to the pole conductor of the direct voltage network in order to obtain a monopolar operation of the converter. No fault of a separate phase leg or a pole conductor may, in such a plant, wipe out the transmission, since in the case of a fault of the type first mentioned above, the phase leg in question will be disconnected, and the additional phase leg switched in. Upon a fault of a pole conductor, the pole conductor will be disconnected and the additional phase leg will be connected to ground and to the two direct voltage connections of the converter, for enabling a monopolar operation thereof.

Further advantages as well as advantageous features of the invention will appear from the following description.

BRIEF DESCRIPTION OF THE DRAWINGS

With reference to the appended drawing, below follows a description of a preferred embodiment of the invention cited as an example.

In the drawing.

DETAILED DESCRIPTION OF PREFERRED EMBODIMENTS OF THE INVENTION

Figure 1:
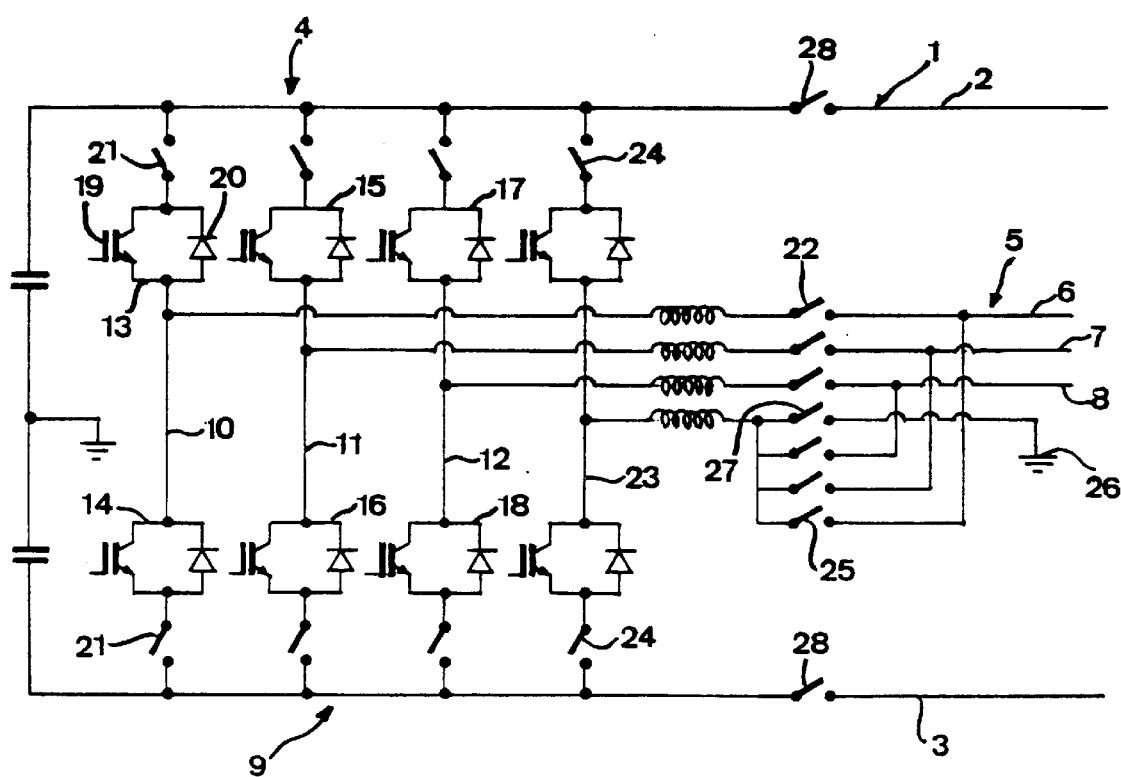
FIG. 1 is a simplified diagram illustrating the principle according to which a plant, according to a preferred of the invention, functions.

The structure of a plant for transmitting electric power according to a preferred embodiment of the invention is schematically illustrated in FIG. 1, in which only the different components having something directly to do with the function according to the invention have been shown in the drawing for facilitating the comprehension of the invention.

The plant comprises a direct voltage network 1 for High Voltage Direct Current (HVDC) having two pole conductors, 2, 3, and an alternating voltage network 5 connected to the direct voltage network through a station 4 and having in the present case three phases 6, 7, 8. The station is adapted to transmit electric power between the direct voltage network 1 and the alternating voltage network 5, in which the power may be fed in from the alternating voltage network to the direct voltage network or fed out from the direct voltage network to the alternating voltage network. Thus, the alternating voltage network may have generators of electric power or only be connected to consumers thereof.

The station comprises at least one VSC-converter 9 adapted to convert direct voltage into alternating voltage and conversely. However, it is possible that the station comprises a plurality of such converters.

The VSC-converter comprises, in a conventional way, a phase leg 10, 11, 12 for each phase with two current valves 13–18, which comprise branches of breakers 19 of turn-on and turn-off type connected in series, preferably in the form of IGBTs, and diodes 20 connected in anti-parallel therewith. A large number of IGBTs may be connected in series in one single valve so as to be turned on and turned off simultaneously to function as one single breaker. Accordingly, the voltage across the valve is distributed among the different breakers 19 connected in series. The control of the breakers 19 takes place in a conventional way through pulse width modulation (PWM).

Each phase leg 10, 11, 12, is connected to the two pole conductors of the direct voltage network through controllable breaker 21, so that the phase leg may be disconnected therefrom by opening the breakers 21. In normal operation of the plant, the three phase legs 10, 11, 12 are connected to the respective phases 6, 7 and 8 of the alternating voltage network 5.

Each connection between a point located between the two current valves of the respective phase leg and the respective phase of the alternating voltage network is provided with a controllable breaker 22 which makes it possible to interrupt the connection between the phase leg and the phase.

The converter has, in addition thereto, a fourth additional phase leg 23, which is constructed in the same way as the three regular phase legs with two current valves. Also, this additional phase leg is, through controllable breakers 24, connectable to, and disconnectable from, the two pole conductors of the direct voltage network. Furthermore, the additional phase leg 23 has connections to each of the phases 6, 7, 8 of the alternating voltage network through controllable breakers 25 which are separate for each phase. This additional phase leg 23 also has a connection to ground 26 through a controllable breaker 27. Finally, controllable breakers 28 are arranged in each of the pole conductors 2, 3.

The function of the plant just described is as follows: in regular operation of the plant without any faults, electric power is transmitted through the station 4 between the alternating voltage network 5 and the direct voltage network 1 by a connection of the three phase legs 10, 11, 12, through closed breakers 21 to the pole conductors of the direct voltage network, and through closed breakers 22 to the phases of the alternating voltage network. The breakers 28 of the pole conductors are then also closed; however, the breakers 24, 25, and 27 of the additional phase leg are open. Should a fault now occur on any of the regular phase legs, then that phase leg is disconnected by opening the breaker 21 and also breaker 22 to the phase which the failed phase leg is connected. The fourth phase leg 23 is simultaneously connected by closing the breaker 24, and closing the breaker 25 located in the connection to the phase in question for switching in the fourth phase leg as a replacement for the failing phase leg. As a result, the transmission may be continued without disturbance while enabling maintenance work to be carried out on the failed phase leg as a result of the redundance provided by the invention.

Should a fault occur on any of the pole conductors 2, 3 in regular operation, this pole conductor will be disconnected through the breaker 28 in question at the same time as the additional phase leg is switched in by closing the breakers 24, and the additional phase leg is connected to ground 26 by closing the breaker 27. The direct voltage is thereby symmetrical over the phase legs of the converter, and a monopolar operation of the converter is enabled in a known way without any interruption of the transmission of the plant. It is then possible to take appropriate measures with respect to the fault, such as, for example, ground fault, of the pole conductor disconnected. It is important that the breakers 28 act fast, preferably within microseconds, to protect the converter and other equipment in such faults. However, the other breakers 21, 22, 24 and 25 do not necessarily have to be fast, although this is an advantage.

The invention is, of course, not in any way restricted to the preferred embodiment described above, but many possible modifications will be apparent to one skilled in the art without departing from the basic idea of the invention as defined in the claims.

The plant may, as already mentioned, comprise a SVC used in a conventional way to stabilize the voltage in a point along an alternating voltage network, in which it then would be provided with a spare phase leg for continued transmission in the case of failure of a regular phase leg. A plant comprising an SVC is where there is no direct voltage network, but instead a capacitor, or plurality of capacitors, is connected. Thus, in one possible embodiment, the direct voltage network 1 with pole conductors 2, 3 and the breakers 28, all shown in FIG. 1, are eliminated.

It is conceivable that the plant has a number of phases other than three, and the number of additional phase legs could also be other than one.

Furthermore, it is in the HVDC-case readily possible to provide the plant with only one additional connectable phase leg for enabling continued transmission upon failure of any regular phase leg and no way to disconnect a failing pole conductor and to make connections for enabling a monopolar operation, although the combination of these two possibilities is particularly advantageous.

What is claimed is:

1. A plant for transmitting electric power having an alternating voltage network having at least one phase and at least one VSC converter, said converter having at least one phase leg with two current valves connected in series, each said phase leg connected at a point between two said current valves to a respective phase, said plant comprising:

at least one additional phase leg in said converter more than the number of phases of said alternating voltage network; and means for disconnecting each phase leg from its respective phase and for connecting said additional phase leg at a point between its two current valves to said respective phase.

2. The plant according to claim 1 wherein said means comprises:

a first controllable breaker arranged in the connection of each phase leg to its respective phase; and at least one second controllable breaker connecting said at least one additional phase leg to at least one phase.

3. The plant according to claim 2 wherein each phase is connected to said at least one additional phase leg through separate second controllable breakers.

4. The plant according to claim 3 comprising one said additional phase leg connected to each of said phases through said separate second controllable breakers.

5. The plant according to claim 1 wherein said alternating voltage network has three phases;

said converter has three phase legs each connected to a respective phase of said alternating voltage network; and one additional phase leg.

6. The plant according to claim 1 wherein said means is adapted to disconnect said at least one phase leg from its respective phase upon a fault of said at least one phase leg and connect said at least one additional phase leg to said respective phase.

7. The plant according to claim 1 wherein said converter is connected to a direct voltage network for High Voltage Direct Current.

8. The plant according to claim 7 further comprising:

two pole conductors in said direct voltage network; and third controllable breakers arranged between each phase leg and each pole conductor whereby each phase leg can be connected to or disconnected from said direct voltage network.

9. The plant according to claim 8 further comprising:

a fourth controllable breaker connected in each pole conductor;

a fifth controllable breaker connecting said at least one additional phase leg to ground; and said means being adapted to disconnect one of said pole conductors when a fault occurs thereon and to close said fifth breaker and said second breaker whereby monopolar operation of said converter is obtained.

10. The plant according to claim 1 wherein the converter act as a Static Var Compensator.

\* \* \* \* \*

UNITED STATES PATENT AND TRADEMARK OFFICE
CERTIFICATE OF CORRECTION

PATENT NO. : 5,872,707
DATED : February 16, 1999
INVENTOR(S): Gunnar Asplund

It is certified that an error appears in the above-identified patent and that said Letters Patent is hereby corrected as shown below:

On the title page, Item [54], and Column 1, line 1,
, please change "SVC" to --VSC--.

Signed and Sealed this

Fifteenth Day of June, 1999

Attest:

Q. TODD DICKINSON

Attesting Officer        Acting Commissioner of Patents and Trademarks